US006911278B2

(12) United States Patent
Hiroshima et al.

(10) Patent No.: US 6,911,278 B2
(45) Date of Patent: Jun. 28, 2005

(54) ELECTRODE CATALYST FOR FUEL CELL AND PROCESS FOR PRODUCING THE SAME

(75) Inventors: Kazutaka Hiroshima, Aichi-gun (JP); Takahiko Asaoka, Aichi-gun (JP); Yutaka Ohya, Aichi-gun (JP); Tatsuo Noritake, Aichi-gun (JP); Hisao Kato, Nisshin (JP); Tetsuo Nagami, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 233 days.

(21) Appl. No.: 10/228,338

(22) Filed: Aug. 27, 2002

(65) Prior Publication Data
US 2003/0054227 A1 Mar. 20, 2003

(30) Foreign Application Priority Data

Sep. 17, 2001 (JP) ........................................ 2001-282075

(51) Int. Cl.[7] .......................... H01M 4/92; H01M 4/96; H01M 4/88
(52) U.S. Cl. ............................ 429/40; 429/44; 502/101; 502/104; 502/326
(58) Field of Search ..................... 429/40, 44; 502/101, 502/104, 326, 339

(56) References Cited

U.S. PATENT DOCUMENTS 4,528,084 A  *  7/1985  Beer et al. .............. 502/101 X
2001/0009733 A1  *  7/2001  Campbell et al. ............. 429/44

FOREIGN PATENT DOCUMENTS

| JP | A 4-371230 | 12/1992 | ............ H01M/4/90 |
| JP | A 6-176766 | 6/1994 | ............ H01M/4/92 |
| JP | A 6-246160 | 9/1994 | ............ H01M/4/88 |
| JP | A 9-206597 | 8/1997 | ............ H01M/4/92 |
| JP | A 2001-68120 | 3/2001 | ............ H01M/4/90 |

OTHER PUBLICATIONS

English Translation of JP 6–176,766 (Jun. 1994) Watanabe et al.*
English Translation of JP 6–246,160 (Sep. 1994) Nakamura et al.*
English Translation of JP 9–206,597 (Aug. 1997) Yamamoto et al.*
English Translation of JP 2001–68,120 (Mar. 2001) Hiroshima et al.*
English Abstract for JP 4–371,230 (Dec. 1992) Enomoto et al.*

* cited by examiner

Primary Examiner—Stephen J. Kalafut
(74) Attorney, Agent, or Firm—Oliff & Berridge, PLC

(57) ABSTRACT

An electrode catalyst for a fuel cell includes a conductive support, and catalytic particles loaded on the conductive support. The catalytic particles include platinum and a base metal being on the lower end of the electrochemical series with respect to platinum. The number of the atoms of the base metal, forming metallic oxides without alloying with the platinum, is less than 5 atomic % of the number of the atoms of the platinum on a surface of the catalytic particles. The electrode catalyst is produced by loading the platinum and base metal on the conductive support, alloying the platinum and base metal thereon by a heat treatment, thereby making the catalytic particles, and removing metallic oxides from a surface of the catalytic particles. The electrode catalyst is less expensive comparatively, exhibits high catalytic activities, and hardly lowers the battery performance of fuel cells.

11 Claims, 2 Drawing Sheets

ELECTRODE CATALYST FOR FUEL CELL AND PROCESS FOR PRODUCING THE SAME

BACKGROUND OF THE INVENTION

1. Field of the Invention

The present invention relates to an electrode catalyst for fuel cells and a process for producing the same.

2. Description of the Related Art

Fuel cells convert chemical energy directly into electric energy by using electrochemical reactions of gasses. Since fuel cells are not subjected to the limitation of the Carnot efficiency, it exhibits high power generation efficiency. Moreover, since fuel cells emit clean exhaust gases, they adversely affect environments extremely less. Accordingly, fuel cells have been recently expected to be used in a variety of applications such as power generation applications, batteries for less-polluting automobiles. Fuel cells can be classified by their electrolytes. For example, the following fuel cells have been known: phosphoric acid-type fuel cells, molten carbonate-type fuel cells, solid oxide-type fuel cells, solid polymer-type fuel cells and the like.

In general, in fuel cells, an electrode-electrolyte assembly makes a power generation unit in which a pair of electrodes are disposed on the opposite sides of an electrolyte. The electrodes are a fuel electrode and an air electrode, respectively. A fuel gas, such as hydrogen and hydrocarbons, is supplied to the fuel cell, and oxygen or air is supplied to the air electrode, respectively. Electricity is collected from fuel cells by developing electrochemical reactions at the 3-phase boundary between the gases, the electrolyte and the electrodes.

Electrode catalysts are used at the respective electrodes, the fuel electrode and the air electrode, in order to develop the aforementioned reactions. As for the electrode catalysts, the electrode catalysts in which platinum is loaded on conductive supports such as carbon have been the mainstream. However, since platinum is expensive, trials have been carried out variously to enhance the catalytic activities by alloying platinum with less expensive metals. For instance, in Japanese Unexamined Patent Publication (KOKAI) No. 4-371,230, a platinum-cobalt 2-way alloy electrode catalyst is disclosed. Moreover, in Japanese Unexamined Patent Publication (KOKAI) No. 6-176,766, a platinum-nickel-cobalt 3-way alloy electrode catalyst is disclosed.

However, according to the follow-up experiments conducted by the present inventors, the catalytic activities of the aforementioned alloy electrode catalysts were not satisfactory. The present inventors further studied on the alloy electrode catalysts. As a result, it was found that the base metals, such as cobalt and nickel, were not solved in platinum entirely but were partially turned into metallic oxides and the like to remain in alloy. Further, since most of the metallic oxides existed so as to cover the surface of the alloy particles, the metallic oxides reduced portions of the alloys which made a reaction field. Thus, it is believed that the metallic oxides lower the usable ratio of the alloys as an electrode catalyst. Furthermore, in a case where such alloys were used as a catalyst for an air electrode of solid polymer-type fuel cells, since the reaction field was a strongly acidic atmosphere, the base metals which formed the metallic oxides eluted out of the metallic oxides as metallic ions. The eluting metallic ions were ion-exchanged with the hydrogen ions in the electrolytes to lower the ionic conductivities of electrolytes. Thus, the metallic oxides degraded the battery performance of the resulting fuel cells. Moreover, due to the presence of the metallic oxides, it was difficult to uniformly form a catalytic layer on the surface of electrolytes.

SUMMARY OF THE INVENTION

The present invention has been developed based on the aforementioned knowledge. It is therefore an object of the present invention to provide an electrode catalyst which is less expensive comparatively, which exhibits high catalytic activities and which does not lower the battery performance of the resulting fuel cells.

An electrode catalyst for a fuel cell according to the present invention comprises: catalytic particles including platinum and a base metal being on the lower end of the electrochemical series with respect to platinum, the number of the atoms of the base metal, forming metallic oxides without alloying with the platinum, being less than 5 atomic % of the number of the atoms of the platinum on a surface of the catalytic particles; and a conductive support on which the catalytic particles are loaded. Namely, the present electrode catalyst is made by loading the catalytic particles including the platinum and the base metal, being on the lower end of the electrochemical series with respect to platinum, on the conductive support. The catalytic particles perform a catalytic function to mainly develop electrode reactions. In particular, since the catalytic particles including the platinum exhibit a high oxygen reducing activity, the present electrode catalyst is proper as a catalyst for air electrodes. Since the platinum and the base metal form the catalytic particles, the present electrode catalyst is much less expensive and exhibits high catalytic activities.

Moreover, the catalytic particles are arranged so that the number of the atoms of the base metal, forming metallic oxides, is less than 5 atomic % of the number of the atoms of the platinum on a surface of the catalytic particles. Namely, the arrangement implies that the metallic oxides, i.e., the oxides of the base metal, are present less on a surface of the catalytic particles. As described above, the base metal, i.e., one of the components of the catalytic particles, is alloyed with the platinum, but is not entirely solved in the platinum, and remains partially as the metallic oxides on a surface of the catalytic particles. When the metallic oxides remain, the usable ratio of alloys, which contribute to the electrochemical reactions, lowers by that extent. Accordingly, the superficial area, which makes the reaction field (or reaction site), is enlarged by reducing the metallic oxides on a surface of the catalytic particles, and thereby it is possible to improve the usable ratio of alloys. Moreover, even when the present electrode catalyst is used in strongly acidic atmospheres, the base metal is inhibited from eluting out of the metallic oxides. Consequently, the present electrode catalyst can inhibit the battery performance of fuel cells from degrading. In addition, even when polymer membranes are used as an electrolyte, it is possible to uniformly form a catalytic layer with the present electrode catalyst on a surface of the electrolyte. Specifically, when a catalytic layer of an electrode is formed on a surface of a polymer which makes an electrolyte, a liquid, in which a polymer and the electrode catalyst are dispersed, is usually coated on a polymer electrolyte membrane, and is dried. In this instance, when metallic oxides are present abundantly on a surface of the catalytic particles, the metallic oxides adsorb to water molecules in the dispersion liquid. Consequently, the dispersibility of the polymer lowers so that the polymer is likely to segregate. Therefore,when the metallic oxides are lessened on a surface of the catalytic particles, it is possible to uniformly mix the electrode catalyst and the polymer without segregating the catalytic particles and the polymer with each other in the resulting catalytic layer. Thus, it is possible to uniformly form the catalytic layer on a surface of the electrolyte.

When producing the present electrode catalyst for a fuel cell, the production process is not limited in particular. However, in accordance with a production process according to the present invention, it is possible to more readily produce the present electrode catalyst. Namely, the present process for producing an electrode catalyst for a fuel cell comprises the steps of: loading platinum and a base metal, being on the lower end of the electrochemical series with respect to platinum, on a conductive support; alloying the platinum and base metal loaded on the conductive support by a heat treatment, thereby making catalytic particles; and removing metallic oxides from a surface of the catalytic particles.

In accordance with the present production process, while the catalytic particles, in which the platinum and the base metal are alloyed, are loaded on the conductive support, it is possible to remove metallic oxides on a surface of the catalytic particles. Hence, it is possible to produce the present electrode catalyst for a fuel cell with ease.

The present electrode catalyst for a fuel cell is arranged so that catalytic particles, including platinum and a base metal which is on the lower end of the electrochemical series with respect to platinum are loaded on a conductive support, and that the number of the atoms of the base metal, forming metallic oxides, is less than 5 atomic % of the number of the atoms of the platinum on a surface of the catalytic particles. Since the comparatively less expensive base metal is used, and since metallic oxides are lessened on a surface of the catalytic particles, the present electrode catalyst is less expensive, exhibits high catalytic activities, and inhibits the battery performance of fuel cells from lowering. Moreover, in accordance with the present production process, it is possible to produce the present electrode catalyst for a fuel cell with ease.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
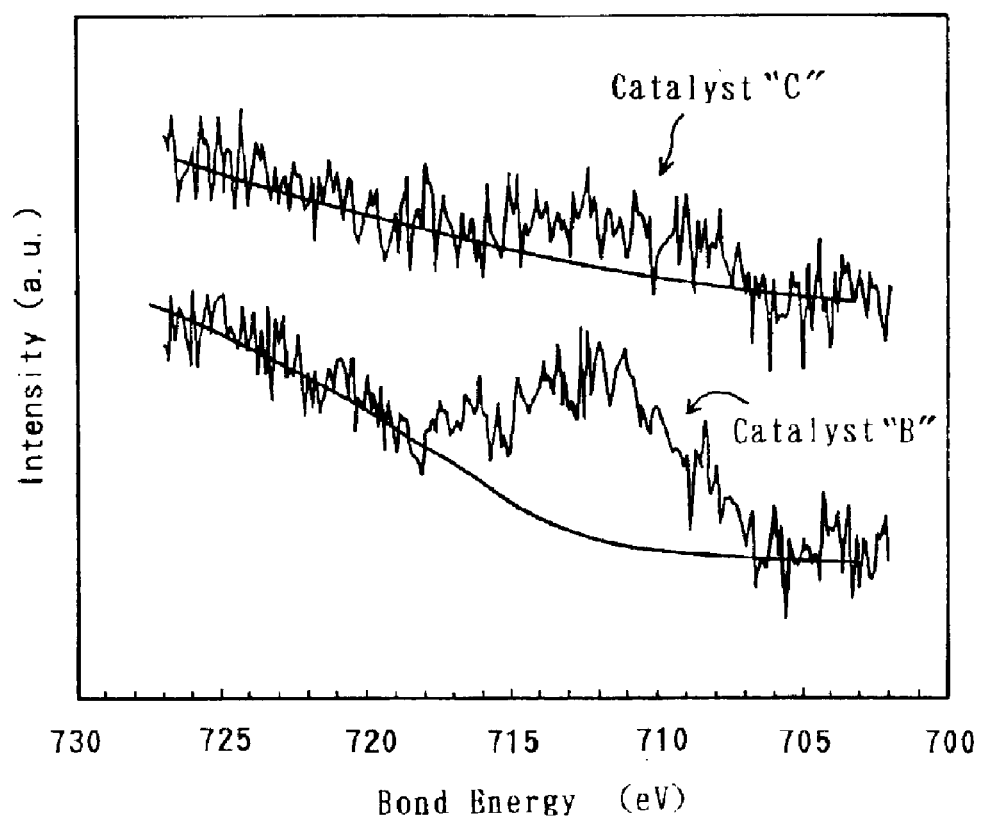
FIG. 1 is a diagram for illustrating the results of a bond energy measurement on catalytic particles in electrode catalysts "B" and "C" by an X-ray photoelectron spectrometer (or XPS)

Having generally described the present invention, a further understanding can be obtained by reference to the specific preferred embodiments which are provided herein for the purpose of illustration only and not intended to limit the scope of the appended claims.

Hereinafter, the present electrode catalyst for a fuel cell and the production process for the same will be described in detail. Note that embodiment modes, which will be hereinafter described, are only a few of embodiment modes. The present electrode catalyst for a fuel cell and the production process for the same are not limited to the following embodiment modes. Beginning with the following embodiment modes, it is possible to embody the present electrode catalyst for a fuel cell and the production process for the same in various modes by modifying, improving and the like as far as a person having ordinary skill in the art can carry out.

Electrode Catalyst for Fuel Cell

The present electrode catalyst for a fuel cell is arranged so that catalytic particles, including platinum and a base metal which is on the lower end of the electrochemical series with respect to platinum, are loaded on a conductive support. The catalytic particles mainly include particles in which the platinum and the base metal are alloyed. The base metal, one of the components of the catalytic particles, is not limited in terms of the types as far as it is a base metal which is on the lower end of the electrochemical series with respect to platinum. For example, it is possible to name Fe, Mn, Co, Ni, Cr, Mo, V and the like. One or two or more members of these metals can be used. In particular, due to the reasons: being rich in natural resources; being less expensive; and greatly effecting an advantage of improving catalytic activities; it is desirable to use at least one of Fe and Mn as the base metal.

The content proportion of the base metal in the catalytic particles is not limited in particular. However, it can desirably be from 5% or more to 50% or less when the sum of the number of the atoms of the platinum and the number of the atoms of the base metal is taken as 100%. The reasons are as follows. When the content proportion of the base metal is less than 5%, the advantage of improving the catalytic activities by alloying is effected less. On the other hand, when it exceeds 50%, the amount of the base metal which does not solve in the platinum enlarges. In particular, taking the improvement of the catalytic activities by alloying into consideration, the content proportion can desirably be 10% or more.

The present electrode catalyst mainly comprises the catalytic particles and the conductive support. The platinum is one of the components of the catalytic particles. The content proportion of the platinum in the entire electrode catalyst is not limited in particular. However, the content proportion of the platinum can desirably be from 10% by weight or more to 60% by weight or more when the entire weight of the electrode catalyst is taken as 100% by weight. The reasons are as follows. When the content proportion of the platinum is less than 10% by weight in the entire electrode catalyst, the platinum cannot fully perform the function as the catalyst so that the electrode reactions are less likely to develop. On the other hand, when it exceeds 60% by weight, the platinum agglomerates so that the area of the surface, functioning as the catalyst, diminishes. Moreover, a catalytic layer is formed based on the platinum content included in the electrode catalyst. Accordingly, taking the diffusion of oxygen into consideration and in view of controlling the thickness of the formed catalytic layer to an appropriate thickness, the content proportion of the platinum can desirably be 20% by weight or more. In addition, in view of uniformly forming the catalytic layer, it can desirably be 40% by weight or less.

In the catalytic particles of the present electrode catalyst, the number of the atoms of the base metal, forming metallic oxides without alloying with the platinum, is less than 5 atomic % of the number of the atoms of the platinum on a surface of the catalytic particles. Not only the base metal is alloyed with the platinum to exist on a surface of the catalytic particles, but also a part of the base metal forms metallic oxides to exist thereon. Among them, the number of the atoms of the base metal, forming metallic oxides, is controlled to less 5% of the number of the atoms of the platinum. The reason is as follows. When the number of the atoms of the base metal exceeds 5% of the number of the atoms of the platinum, the amount of metallic oxides enlarges on a surface of the catalytic particles so that the catalytic activities of the platinum lower as described above. Accordingly, the battery performance of fuel cells lowers. In order to furthermore enhance the catalytic activities and in order to furthermore inhibit the battery performance from degrading, the number of the atoms of the base metal, forming metallic oxides on a surface of the catalytic particles, can desirably be controlled to less than 3% of the number of the atoms of the platinum. Note that, depending on the base metal to be used, a variety of metallic oxides are formed. For example, when Fe is used as the base metal, it is possible to name FeO, $Fe_2O_3$ and the like as the metallic oxides. When Mn is used as the base metal, it is possible to name $MnO_2$, $Mn_2O_3$ and so forth as the metallic oxides.

Note that, in the present specification, the composition of the catalytic particles was measured by an X-ray photoelectron spectrometer (hereinafter abbreviated to as "XPS") which used an $MgK_\alpha$-ray as an X-ray source and the composition which was obtained from the measurement results was employed as the composition on a surface of the catalytic particles. Namely, a surface of the catalytic particles refers to a portion of the catalytic particles down to a depth of a few nanometers from the outermost surface of the catalytic particles, portion which corresponds to the measurable range of an XPS. For instance, when Fe is used as the base metal, it is possible to find the composition on a surface of the catalytic particles in the following manner. First, a profile is prepared by the XPS measurement. In the profile, the existing amount of Fe on a surface of the catalytic particles is calculated from the peak area of the Fe2p signal. Likewise, the existing amount of Pt on a surface of the catalytic particles is calculated from the peak area of the Pt4f signal. Then, by using signals which appear on different bond energy positions depending on the oxidized states of atoms, the peaks of entire Fe are isolated for every oxidized state to determine the number of the Fe atoms forming metallic oxides. Note that since the escaping likelihood of photoelectrons depends on atoms, it is good to find sensitivity coefficients in advance from the peak-area values of samples whose compositions are known and to determine the composition on a surface of the catalytic particles in accordance with the sensitivity coefficients.

In the catalytic particles of the present electrode catalyst, the particle diameters are not limited in particular. However, in view of enlarging the surface area contributing to the electrode reactions and enhancing the catalytic activities, an average particle diameter of the catalytic particles can desirably be controlled to 5 nm or less. Note that, as a simple method of measuring an average particle diameter of the catalytic particles, a method is available in which a transmission electron microscope (hereinafter abbreviated to as "TEM"). Namely, the particle diameters of the identifiable catalytic particles can be measured by observing the catalytic particles with a TEM, and an average value of the resulting particle diameters can be employed as an average particle diameter of the catalytic particles.

The above-described catalytic particles are loaded on a conductive support to make the present electrode catalyst.

The conductive support is not limited in particular. For example, for the reason of the good conductivity and less expensive cost, it is possible to use carbonaceous materials such as carbon black, graphite and carbon fibers. Moreover, for the reason of the large surface area per unit weight, the conductive support can desirably be powdery. In this case, particle diameters of the particles of the conductive support can desirably be controlled in a range of from 0.03 µm or more to 0.1 µm or less. Moreover, the particles of the conductive support can desirably form a structure in which primary particles are agglomerated.

Process for Producing Electrode Catalyst for Fuel Cell

In the present invention, the process for producing the above-described present electrode catalyst for a fuel cell is not limited in particular. However, in accordance with the present production process, it is possible to more readily produce the present electrode catalyst. Namely, the present process for producing an electrode catalyst for a fuel cell comprises the steps of loading, alloying and removing metallic oxides. Hereinafter, the respective steps will be described in detail.

(1) Loading Step

This step is a step in which platinum and a base metal, being on the lower end of the electrochemical series with respect to the platinum, are loaded on a conductive support. The method of loading the two metals is not limited in particular, and can be done by following ordinarily used methods. For example, into an aqueous solution which includes the complex of platinum sulfite, a powdery conductive support is added in a predetermined amount, and hydrogen peroxide water is further added to load the platinum on the conductive support. In order to control the content proportion of the platinum to a target proportion, the concentration of the aqueous solution which includes the complex of platinum sulfite and the addition amount of the conductive support can be appropriately adjusted while taking the weight of the later added base metal into consideration as well. Then, the conductive support with the platinum loaded is dispersed in water, and an aqueous solution of a salt in which the base metal makes the positive ions is added to the dispersion liquid. Thereafter, the resulting mixture dispersion liquid is stirred to load the base metal on the conductive support while keeping the pH of the mixture dispersion liquid at a predetermined value. Note that, in order to control the content proportion of the base metal to a target proportion, the concentration and the like of the aqueous solution of a salt in which the base metal makes the positive ions can be appropriately adjusted. The conductive support with the thus loaded metals is filtered, dried and so forth, and can be used in the subsequent step.

(2) Alloying Step

This step is a step in which the platinum and base metal, loaded on the conductive support, is alloyed to make catalytic particles by a heat treatment. The heat treatment is not limited in particular, and can be done by following ordinarily used methods. For example, the conductive support, prepared in the above-described loading step and loaded with the platinum and base metal, can be held at a temperature of about 900° C. in an inert atmosphere for 2 hours approximately. By carrying out such a heat treatment, the platinum and base metal, loaded on the conductive support, are alloyed to make catalytic particles.

(3) Metallic Oxides Removing Step

This step is a step in which metallic oxides, existing on a surface of the catalytic particles, are removed. The method of removing the metallic oxides are not limited in particular. It can be methods in which the existing metallic oxides themselves are removed, or it can be methods in which oxygen, bonded with the base metal in the metallic oxides, is removed.

As an example of the former methods, it is possible to employ a method in which the metallic oxides are removed by treating the conductive support with the catalytic particles loaded by using an acid. The specific way for carrying out the acid treatment is not limited in particular. For example, it is possible to carry out the acid treatment by dispersing the conductive support with the catalytic particles loaded in an acidic aqueous solution. In this case, the types of the usable acid are not limited in particular. For instance, it is possible to use an aqueous solution of an acid which is at least one member selected from the group consisting of sulfuric acid, nitric acid, hydrofluoric acid, acetic acid and the like. Especially, for the reason of allowing a catalytic layer to form uniformly, the acidic aqueous solution can desirably be an aqueous solution of sulfuric acid. Moreover, the acid treatment can be carried out at room temperature. The concentration of the acidic aqueous solution can be from 0.1 to 2 M approximately. The time for the acid treatment can be about 10 minutes. Note that, after the acid treatment, the conductive support with the catalytic particles loaded is filtered, dried, pulverized and so forth to make an aimed electrode catalyst.

Moreover, as an example of the latter methods, it is possible to employ a method in which the conductive support with the catalytic particles loaded is subjected to a reducing treatment, thereby removing metallic oxides. The specific way for carrying out the reducing treatment is not limited in particular. For example, it is possible to carry out the reducing treatment by heating the conductive support with the catalytic particles loaded at about 200° C. in a hydrogen atmosphere.

Usage Mode of Electrode Catalyst

The present electrode catalyst for a fuel cell can be used, for example, as an electrode catalyst for a solid polymer-type fuel cell. In this case, the present electrode catalyst can be, for instance, dispersed in a liquid which includes a polymer making an electrolyte. The resulting dispersion liquid can be coated and dried on an electrolyte membrane, thereby forming a catalytic layer, including the present electrode catalyst, on a surface of the electrolyte membrane. Then, a carbon cloth and the like can be further heat-pressed onto a surface of the catalytic layer, thereby making an electrode-electrolyte assembly.

EXAMPLE

Based on the above-described modes of embodiment, a variety of electrode catalysts were produced. Then, solid polymer-type fuel cells were made by using the produced respective electrode catalysts, and were assessed for the battery characteristics. Hereinafter, the present specification describes on the production of the electrode catalysts, the preparation of the solid polymer-type fuel cells and the assessment of the battery characteristics.

Production of Electrode Catalysts

In order to produce an electrode catalyst, Fe was used as the base metal, and carbon black was used as the conductive support. First, 1.5 g of hexahydroxyplatinate was dispersed in 50 mL of water in a reaction container, and 100 mL of a sulfurous acid aqueous solution was further added to the water. The sulfurous acid aqueous solution had a concentration of 6% by weight. The mixture dispersion was stirred for 1 hour. Thereafter, the reaction container was immersed in an oil bath to remove the remaining sulfurous acid. The oil bath was heated to 120° C. Then, the reaction container was cooled to prepare an aqueous solution of the platinum sulfite complex. The aqueous solution included Pt in an amount of 4 g/L. Subsequently, a carbon black powder was added in an amount of 3 g to 187 mL of the aqueous solution of the platinum sulfite complex in a reaction container, and an $H_2O_2$ aqueous solution was further added thereto. The $H_2O_2$ aqueous solution had a concentration of 20% by weight. The reaction container was immersed in an oil bath to react the mixture aqueous solution, and thereby platinum was loaded on the carbon black powder. The oil bath was heated to 120° C. Then, the mixture aqueous solution was poured over a filter to filter out solids. The filtered solids were dried in vacuum, and were pulverized. Moreover, the pulverized solids were reduced at 200° C. in a hydrogen gas flow. Thus, a catalyst (hereinafter referred to as "Pt/C catalyst") was obtained in which the platinum was loaded on the carbon black powder. Note that this Pt/C catalyst was labeled Catalyst "A."

5 g of the Catalyst "A" was dispersed in distilled water to prepare a catalyst dispersion liquid. To the catalyst dispersion liquid, an iron nitrate aqueous solution was added so that the content proportion of Fe was 50% by atomic ratio, and an ammonia aqueous solution was added so that the pH value of the catalyst dispersion liquid was adjusted to 10. The catalyst dispersion liquid was stirred at room temperature for 3 hours, and thereby iron was further loaded on the carbon black powder with the platinum loaded. Note that the content proportion of the platinum was 20% by weight in the Catalyst "A." Then, the catalyst dispersion was poured over a filter to filter out solids. The filtered solids were dried in vacuum. Thus, a catalyst was obtained in which the platinum and iron were loaded on the carbon black powder.

The resulting catalyst was subjected to a heat treatment by holding it at 900° C. in an argon gas flow for 2 hours, thereby making catalytic particles in which the platinum and iron were alloyed. Thus, a catalyst (hereinafter referred to as "Fe—Pt/C catalyst") was obtained in which the catalytic particles, being the alloys of the platinum and iron, were loaded on the carbon black powder. Note that this Fe—Pt/C catalyst was labeled Catalyst "B." Further, the Catalyst "B" was dispersed in 500 mL of a sulfuric acid aqueous solution, and the mixture dispersion liquid was stirred at room temperature for 3 hours to carry out an acid treatment. The sulfuric acid had a concentration of 1 M. Then, the mixture dispersion liquid was poured over a filter to filter out solids. The filtered solids were dried in vacuum, and were pulverized. Thus, a catalyst was obtained which was subjected to the acid treatment. In the Fe—Pt/C catalyst, the catalytic particles had an average particle of 2.5 nm. Note that the Fe—Pt/C catalyst, subjected to the acid treatment, was an electrode catalyst according to the present invention, and was labeled Catalyst "C."

The compositions of the catalytic particles in the thus produced Catalysts "B" and "C" were measured by an XPS which used $MgK_\alpha$ ray as the X-ray source. The results of the measurement by the XPS were illustrated in FIG. 1, and were summarized in Table 1.

TABLE 1

| Electrode Catalyst | Fe in Oxides (atomic %) | Pt (atomic %) | Fe/Pt |
|---|---|---|---|
| Catalyst "B" | 0.28 | 0.64 | 0.43 |
| Catalyst "C" | 0.01 | 0.65 | 0.02 |

FIG. 1 illustrates the XPS profiles of the catalytic particles of the Catalyst "B" and Catalyst "C." By comparing the XPS profiles, it is seen that peaks appeared more in the vicinity of bond energies which fell in the range of from 710 to 715 eV in the catalytic particles of the Catalyst "B" than in the catalytic particles of the Catalyst "C." The peaks, appearing in the bond energy range, are peaks which mainly result from Fe forming oxides. Accordingly, it is understood that many Fe atoms, forming oxides, were present on a surface of the catalytic particles of the Catalyst "B. " Moreover, as summarized in Table 1, in the catalytic particles of the Catalyst "B," the proportion of the number of the Fe atoms, forming oxides, was about 0.43 with respect to the number of the Pt atoms, namely approximately 43%. On the other hand, in the catalytic particles of the Catalyst "C," the proportion of the number of the Fe atoms, forming oxides, was about 0.02 with respect to the number of the Pt atoms, namely approximately 2%. Thus, it was possible to verify that, in the Catalyst "C" being the present electrode catalyst, metallic oxides were removed from a surface of the catalytic particles by carrying out the acid treatment, and that the number of the iron atoms, which were not alloyed with the platinum atoms, was less than 5% of the number of the platinum atoms. Note that, according to the results of an analysis on the catalytic particles of the Catalysts "B" and "C" by the X-ray diffraction method, no appreciable difference was observed in the X-ray diffraction spectra on both of the catalytic particles. Namely, it was proved that the acid treatment selectively removed metallic oxides on a surface of the catalytic particles and little affected the catalytic particles themselves.

Preparation of Solid Polymer-Type Fuel Cells

The thus produced respective Catalysts "A," "B" and "C" were used as a catalyst for an air electrode to prepare 3 types of solid polymer-type fuel cells. The Catalysts "A," "B" and "C" were mixed in a Nafion (trademark) polymer solution so as to adjust the Pt content per 1 cm$^2$ of an air electrode surface to 0.3 g, thereby making a paste, respectively. The Nafion polymer solution is a dispersion of perfluorosulfonic acid and polytetrafluoroethylene copolymer, and is a product of E. I. du Pont de Nemours Company. The pastes were coated on one of the opposite surfaces of a Nafion membrane which made an electrolyte, and were dried to make a catalytic layer for an air electrode, respectively. The Nafion membrane is a proton exchange membrane produced by the same company. As a catalyst for a fuel electrode of all of the 3 polymer-type fuel cells, the Catalyst "A" which was made into a paste in the above-described manner was used. The paste was coated on the other opposite surface of the Nafion membranes, and was dried to make a catalytic layer for a fuel electrode. Then, a carbon cloth, which made a diffusion layer, was bonded on a surface of the catalytic layers of the air and fuel electrodes by hot-pressing, respectively. Thus, 3 electrode-electrolyte assemblies were prepared. Finally, the thus prepared electrode-electrolyte assemblies were held between separators to make fuel cells. The separators were made from carbon.

Assessment on the Battery Characteristics

On the thus prepared respective fuel cells, the battery characteristics were assessed. Humidified hydrogen was supplied to the fuel electrodes, and humidified air was supplied to the air electrodes. The humidified hydrogen exhibited a dew point of 90° C., and the humidified air exhibited a dew point of 70° C. The fuel cells were operated at an operating temperature of 80° C. Note that the humidified hydrogen was supplied at a flow rate of 50 mL/(min·cm$^2$) under a pressure of 0.2 MPa and the humidified air was supplied at a flow rate of 100 mL/(min·cm$^2$) under a pressure of 0.2 MPa.

Figure 2:
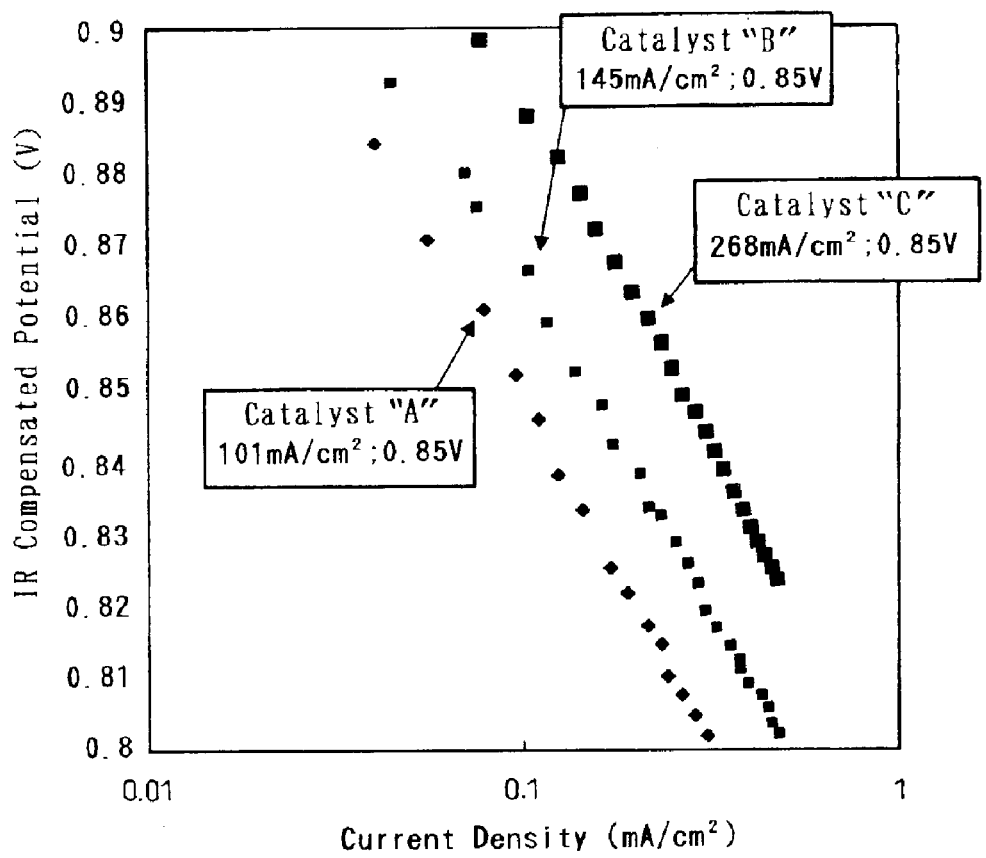
FIG. 2 is a graph for illustrating the relationships between battery voltages and current densities in cells in which electrode catalysts were used.

FIG. 2 illustrates the relationships between the battery voltages and the current densities in the fuel cells in which the respective catalysts were used. Note that the vertical axis specifies the effective battery voltages which were obtained by subtracting the voltage drop, resulting from the internal resistance and the like, from the actual voltages. Since the catalytic activities greatly affected the battery voltages in the low current density region, the current densities were compared at which the fuel cells exhibited an effective battery voltage of 0.85 V. As a result, it was found that the fuel cell which used the Catalyst "A" exhibited an electric current density of 101 mA/cm$^2$, the fuel cell which used the Catalyst "B" exhibited an electric current density of 145 mA/cm$^2$ and the fuel cell which used the Catalyst "C" exhibited an electric current density of 268 mA/cm$^2$. Thus, it was possible to confirm that the fuel cell which used the present electrode catalyst exhibited the largest current density, and that the electrode reactions were remarkably promoted in the fuel cell.

Moreover, the respective fuel cells were analyzed for the hydrogen elimination waves which were obtained by the cyclic voltamogram measurement as the index of a platinum area which contributed to the electrode reactions in an operating fuel cell, i.e., a so-called effective platinum area. According to the analysis, the fuel cell which used the Catalyst "A" showed an effective platinum area of 50 mC/cm$^2$, the fuel cell which used the Catalyst "B" showed an effective platinum area of 43 mC/cm$^2$ and the fuel cell which used the Catalyst "C" showed an effective platinum area of 53 mC/cm$^2$. Hence, it was possible to justify that, in the catalytic particles of the Catalyst "C," metallic oxides were removed by subjecting the catalytic particles to the acid treatment, and that the catalytic particles in the Catalyst "C" showed the enlarged effective platinum area compared with that of the catalytic particles in the Catalyst "B."

Having now fully described the present invention, it will be apparent to one of ordinary skill in the art that many changes and modifications can be made thereto without departing from the spirit or scope of the present invention as set forth herein including the appended claims.

What is claimed is:

1. An electrode catalyst for a fuel cell, the electrode catalyst comprising:

catalytic particles including platinum and a base metal being lower than platinum of an electrochemical series, the number of the atoms of the base metal, forming metallic oxides without alloying with the platinum, being less than 5 atomic % of the number of the atoms of the platinum on a surface of the catalytic particles; and a conductive support on which said catalytic particles are loaded.

2. The electrode catalyst for a fuel cell set forth in claim 1, wherein the base metal is at least one member selected from the group consisting of Fe, Mn, Co, Ni, Cr, Mo and V.

3. The electrode catalyst for a fuel cell set forth in claim 1, wherein a content proportion of the base metal in said catalytic particles is from 5% or more to 50% or less when the sum of the number of the atoms of the platinum and the number of the atoms of the base metal is taken as 100%.

4. The electrode catalyst for a fuel cell set forth in claim 1, wherein the platinum is included in a proportion of from 10% by weight or more to 60% by weight or more when the entire weight of said electrode catalyst is taken as 100% by weight.

5. The electrode catalyst for a fuel cell set forth in claim 1, wherein an average particle diameter of said catalytic particles is 5 nm or less.

6. The electrode catalyst for a fuel cell set forth in claim 1, wherein said conductive support is a carbonaceous material.

7. A process for producing an electrode catalyst for a fuel cell, the process comprising the steps of:
loading platinum and a base metal, being lower than platinum of an electrochemical series, on a conductive support;
alloying the platinum and base metal loaded on the conductive support by a heat treatment, thereby making catalytic particles; and
removing metallic oxides from a surface of the catalytic particles.

8. The process for producing an electrode catalyst for a fuel cell set forth in claim 7, wherein the conductive support with the catalytic particles loaded is subjected to an acid treatment in said removing step, thereby removing metallic oxides.

9. The process for producing an electrode catalyst for a fuel cell set forth in claim 8, wherein the acid treatment is carried out by dispersing the conductive support with the catalytic particles loaded in an acidic aqueous solution.

10. The process for producing an electrode catalyst for a fuel cell set forth in claim 9, wherein the acidic aqueous solution is an aqueous solution of sulfuric acid.

11. A fuel cell comprising:
an electrolyte having opposite sides; and
a pair electrodes disposed on the opposite sides of said electrolyte, wherein one of the electrodes includes electrode catalyst comprising:
catalytic particles including platinum and a base metal being lower than platinum of an electrochemical series, the number of the atoms of the base metal, forming metallic oxides without alloying with the platinum, being less than 5 atomic % of the number of the atoms of the platinum on a surface of the catalytic particles; and
a conductive support on which said catalytic particles are loaded.

* * * * *